Nov. 30, 1937.  A. C. MABEE  2,100,718
AUTOMOBILE LOCK
Original Filed July 29, 1936
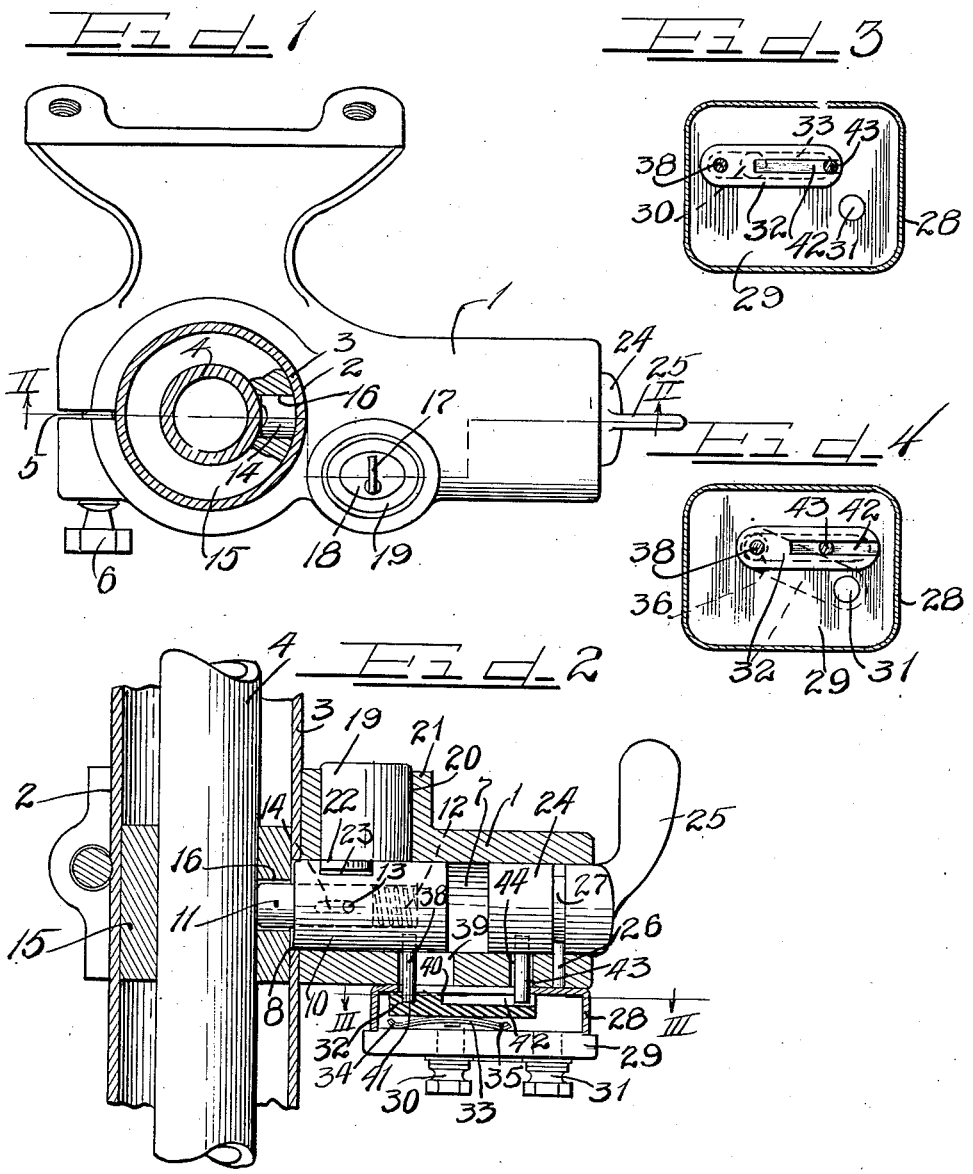
Inventor
Alexander C. Mabee
by Charles Bell
Attys.

Patented Nov. 30, 1937

2,100,718

UNITED STATES PATENT OFFICE 2,100,718

AUTOMOBILE LOCK

Alexander C. Mabee, Villa Park, Ill., assignor to Oakes Products Corporation, North Chicago, Ill., a corporation of Michigan Original application July 29, 1936, Serial No. 93,156. Divided and this application December 30, 1936, Serial No. 118,200

8 Claims. (Cl. 200—44)

This invention relates to a lock structure adapted particularly for use on automotive vehicles for locking operation controls, such as, for example, the steering and the ignition. The invention concerns particularly a two-stage or sequential operation type of lock, with the first stage operation effecting unlocking or release of the steering and establishing operating conditions for an ignition controlling switch, and with the second stage operation effecting opening or closing of the ignition controlling switch.

This application is filed as a division of my copending application, Serial No. 93,156, filed July 29, 1936, to cover structure disclosed but not specifically claimed in the copending application.

An important object of the invention is to provide an arrangement comprising a locking element shiftable axially to locking or unlocking position by a key controlled means, and a rotatable switch controlling element, usually comprising a lever, with interconnecting means adapted, when the locking bolt is in its unlocking position, to establish such operative connection between the switch control element and the switch that, upon rotation of the control element, the switch may be operated for opening and closing the ignition circuit, and said interconnecting means being adapted, when the lock bolt is in locking position, to disconnect the switch controlling element from such operative connection with the switch so that the switch controlling element is then free for rotational movement, but without any operation of the switch to affect the circuit. In other words, when the locking bolt is in unlocking position, the rotational movement of the switch controlling element will be effective to operate the switch for circuit control, but when the lock bolt is in locking position, the switch controlling element is freely rotatable, but its rotation will have no effect, either to open or to close the ignition circuit.

A further object of the invention is to provide structure in which the movable element of a switch is connected with both the locking bolt and the rotatable switch controlling element, but with the arrangement such that when the locking bolt is in locking position, the movable switch element will be held dissociated from the switch contacts so that, although the rotational movement of the switch controlling element will move the movable switch element, there can be no circuit control, and when the lock bolt structure is in its unlocking position the movable switch element will have been moved thereby for association with the switch contacts and opening or closing of the circuit when the switch controlling element is rotated, the switch being thus ineffectively operable when the locking bolt is in locking position, and effectively operable only when the bolt is in unlocking position.

My invention is shown incorporated in the structure disclosed on the drawing, in which drawing:

Figure 1 is a plan view of the lock structure applied to a steering column which is shown in transverse section;

Figure 2 is a section on plane II—II of Figure 1;

Figure 3 is a section on plane III—III of Figure 2;

Figure 4 is a view similar to Figure 3, showing the movable switch element in another position.

The lock structure shown comprises a generally cylindrical body 1 having a cylindrical opening 2 therethrough at its left end for receiving the tube 3 which surrounds the steering shaft 4 of an automobile, the body being slit as indicated at 5 so that the material around the opening 2 may securely clamp the tube 3 by tightening of a screw 6.

The body 1 has the cylindrical bore 7 registering at its open end with a passage 8 in the tube 3, the outer end of the bore being open. Slidable in the bore 7 is a lock bolt structure comprising the barrel 10 and the locking plunger 11, a spring 12 within the barrel urging the plunger outwardly, such outward movement being limited as by means of a pin 13 in the barrel 10 engaging in a channel 14 in the plunger.

The steering shaft has a bushing 15 secured thereto provided with a hole 16, and when this hole is in axial alignment with the bore 7, and the lock bolt structure shifts outwardly, the plunger 11 will enter the hole to lock the steering shaft against rotation by the steering wheel. The shifting of the lock bolt structure is controlled by the turning of a key in the keyhole 17 of a tumbler lock cylinder 18 within the lock barrel 19 secured in the bore 20 in the boss 21 extending from the body 1, the lock cylinder at its inner end carrying a cam 22 engaging in the notch 23 in the lock bolt barrel 10, so that when the key is turned the lock bolt structure may be shifted into steering locking or unlocking position.

The switch controlling element comprises a cylindrical hub 24 extending into the outer end of the bore 7, and at its outer end has an arm or lever 25 by which it may be rotated. A pin 26 anchored in the body 1 projects into the circumferentially extending channel 27 in the hub 24 and holds the controlling element against axial movement in the bore 7.

The switch mechanism is contained within a sheet metal housing 28 which engages with its base against the under or rear side of the body 1 and has a cover 29 of insulating material supporting circuit terminals 30 and 31. Within the switch housing is the movable switch element comprising the oblong block 32 of insulating material, the inner side of which engages the bottom of the casing 28, and which on its outer side carries a switch blade 33 parallel therewith and anchored thereto intermediate its ends. The ends 34 and 35 of the switch blade are adapted for cooperation with the circuit terminals 30 and 31 supported by the cover 29 for the switch casing, but such cooperation is controlled by the position of the lock bolt structure. The lock bolt structure has the pin 38 extending radially therefrom through a longitudinal slot 39 in the body 1, the pin extending through a slot 40 in the bottom of the casing 29 and into the hole 41 in the inner side of the switch block, this hole being opposite the end 34 of the switch blade, the pin thus coupling the switch block to the lock bolt body 10 and forming also a pivot for swinging or rotational movement of the switch block in the switch housing. The pin also serves to hold the lock structure body against rotational movement in the bore 7.

In the inner side of the switch block at the free end thereof is a longitudinally extending channel 42 which receives the end of a pin 43 extending radially from the switch actuating element hub 24 through the slot 44 in the body 1 and the slot 40 in the bottom of the switch casing. When the switch controlling element is rotated, the pin 43 will cause rotational or swinging movement of the switch block 32 on the pivot pin 38, but the effective operation of the switch will depend upon the position of the locking bolt structure. When the lock bolt structure is in its steering locking position, as shown in Figure 2, the switch block will be held in its inner position, with the pivot end of its switch blade in longitudinal alignment with, but out of contact with, the terminal 30. The terminal 31 is to one side of the longitudinal path of travel of the switch block and away from the switch blade, so that neither terminal is engaged by the switch blade when the lock bolt structure is in locking position. Now, when the switch controlling element 24 is oscillated, the switch block will be correspondingly oscillated, but there will be no engagement of the switch blade with the circuit terminals, and the circuit, such as the ignition circuit, cannot be controlled. However, when the lock bolt structure shifts outwardly to unlocking position, the switch block is shifted longitudinally therewith to bring the pivot end 34 of the switch blade into contact with the terminal 30, and to bring the other end 35 of the blade at one side of the terminal 31, as shown by the full lines in Figure 4. The circuit will still be open, but when the controlling element 24 is rotated in clockwise direction, the switch block will swing to carry the switch blade end 35 into engagement with the contact 31 for closure of the circuit, as shown by the dotted lines in Figure 4, and upon reverse rotation of the controlling element, the switch will again be opened. Thus, when the locking bolt structure is in steering locking position, the switch controlling element can be freely rotated and, although the movable switch member moves with the controlling element, it is incapable of effecting any circuit control. However, when the lock bolt structure is moved to unlocking position, the switch movable member is so located that rotation of the controlling element will cause actuation thereof for effective circuit control, and the circuit may be opened or closed as desired, so long as the lock bolt structure remains in unlocking position.

It will be noted that the lock structure shown and described may be selectively used and operated as a two-stage lock, or merely as a coincidental lock. If operated as a two-stage or sequential lock, and it is desired to lock the steering and the ignition, the controlling element 24 is first rotated to bring the switch back to circuit opening position, and then the key is turned to shift the lock bolt structure into steering locking position and to return the switch block for disconnection of its switch blade from the terminal contacts, and to unlock, the key is first turned to shift the locking bolt structure to unlocking position and move the switch blade to its effective field of operation with the circuit open, and then the switch actuating element 24 is rotated to move the switch blade for closure of the ignition circuit.

When the driver of an automobile desires to use the lock only as a coincidental lock, he will leave the controlling element 24 in switch closing position when he desires to stop the engine and lock the steering, and he merely turns the key to shift the lock bolt to steering locking position and to coincidentally open the ignition circuit by the withdrawal of the switch blade from the switch terminal contacts, and when the automobile is again to be used he merely turns the key for shift of the lock bolt structure to unlocking position with the resulting coincidental closure of the ignition circuit as the switch blade is shifted back to the circuit closing position from which it was shifted when the lock bolt structure was moved to locking position.

Whether the lock be used as a two-stage lock or as a purely coincidental lock, the switch controlling or actuating element 24 will be freely rotatable without any effective switch actuation thereby when the lock bolt structure is in steering locking position, and the ignition is thus locked.

I have shown a practical and efficient embodiment of the various features of my invention, but I do not desire to be limited to the exact construction, arrangement and operation as shown and described, as changes and modifications are possible which would still come within the scope of the invention.

I claim as my invention:

1. In lock structure of the class described, a locking bolt, a switch comprising movable structure and stationary structure, a switch actuating element freely movable at all times in a fixed path, a connection between said actuating element and the movable switch structure, and means effective upon movement of said locking bolt to locking position for moving said movable switch structure to a position where actuation thereof by said actuating element cannot effect circuit controlling cooperation of the switch structure, said means being effective upon movement of the locking bolt to unlocking position to move the movable switch member to a position where actuation thereof by said actuating element will permit cooperation of the switch structures for circuit control.

2. In a lock structure of the class described, a locking bolt, a switch comprising a movable switch blade element and switch control contacts, a switch actuating member connected with said switch blade element, and means whereby movement of said locking bolt to unlocking position will set said switch blade element relative to the switch contacts for movement of the switch element by said actuating member for engagement with said contacts for effective circuit control, and movement of said locking bolt to locking position will set said switch blade element to prevent movement thereof by said actuating member for effective circuit control.

3. In a lock structure of the class described, a locking bolt, a switch comprising a movable switch blade element and stationary switch contacts, a switch actuating member having connection with said switch blade element for lateral movement thereof relative to said contacts, and means whereby movement of said locking bolt to locking position will shift said switch blade element longitudinally to an ineffective position where actuation of said element by said actuating member cannot effect cooperation of said switch blade element with said contacts for circuit control, and movement of said locking bolt to unlocking position will set said switch blade element into position where said actuating member may move said switch blade element into association with contacts for effective circuit control.

4. In a lock structure of the class described, a locking bolt, a switch comprising a switch blade element and switch contacts, said switch blade element being adapted for bodily longitudinal movement and for lateral movement, an actuating member controlling the lateral movement of said switch blade element, said locking bolt structure controlling the longitudinal movement of said switch blade element, the arrangement being such that when said locking bolt is moved to unlocking position, said switch blade element will be set into position for lateral movement thereof by said actuating member and cooperation thereof with said contacts for circuit control, and when said locking bolt is moved to locking position, said switch blade element will be removed from said contacts so that movement thereof by said actuating member cannot effect cooperation thereof with said contacts.

5. In a lock structure of the class described, a locking bolt, an electrical switch, an actuating member for said switch movable in a fixed path for actuating said switch for circuit control when said locking bolt is in unlocking position, and means controlled upon movement of said locking bolt to locking position for displacing one of the switch elements whereby to render the actuation of said switch by said actuating member incapable of effecting circuit control.

6. In a lock structure of the class described, a locking bolt, a switch comprising a movable element and a stationary element, an actuating member freely movable in a fixed path and having permanent connection with the movable switch element, and means whereby movement of said locking bolt to locking position will shift the movable switch element relative to the stationary element so that actuation of the movable element by said actuating member cannot effect cooperation of the switch elements for circuit control, and movement of said locking bolt to unlocking position will shift the movable switch element for actuation by said actuating member for cooperation thereof with the stationary element for circuit control.

7. In a lock structure of the class described, a circuit controlling switch, an actuating member for said switch and a locking bolt coaxial therewith, said locking bolt being non-rotatable but being shiftable axially to locking or unlocking position, said actuating member being held against axial shift but being freely rotatable during either position of said locking bolt, a connection whereby said actuating member may actuate said switch during either position of said locking bolt, and a connection between said locking bolt and switch effective upon movement of the bolt to locking position to render said actuating member connection ineffective to actuate the switch for circuit control but adapted upon movement of the locking bolt to unlocking position to render the actuating member connection effective for actuation of the switch for circuit control.

8. In a lock structure of the class described, an electrical circuit switch comprising movable and stationary elements, a locking bolt and a switch actuating member co-axial therewith, said locking bolt being adapted for axial shift to locking or unlocking position, said actuating member being held against axial shift but being freely rotatable during either position of said locking bolt and independently thereof, means whereby movement of said locking bolt to locking position will dissociate the switch elements whereby actuation of the switch by the actuating member will be ineffective for any circuit control and movement of said locking bolt to unlocking position will associate the switch elements for actuation thereby of said actuating member to open or close the circuit, said locking bolt being movable to locking position whether said actuating member is in circuit opening or circuit closing position whereby movement of said locking bolt back to unlocking position will coincidentally re-establish the circuit condition corresponding to the position in which the actuating member was left when the bolt was moved to locking position.

ALEXANDER C. MABEE.